United States Patent
Zhu

(10) Patent No.: US 11,522,623 B2
(45) Date of Patent: Dec. 6, 2022

(54) DETERMINING AN ENCODING SCHEME FOR DIFFERENTIAL RSRP REPORTING

(71) Applicant: LENOVO (BEIJING) LIMITED, Beijing (CN)

(72) Inventor: Chenxi Zhu, Fairfax, VA (US)

(73) Assignee: LENOVO (BEIJING) LIMITED, Beijing (CN)

(*) Notice: Subject to any disclaimer, the term of this patent is extended or adjusted under 35 U.S.C. 154(b) by 64 days.

(21) Appl. No.: 16/970,075

(22) PCT Filed: Feb. 14, 2018

(86) PCT No.: PCT/CN2018/076844
§ 371 (c)(1),
(2) Date: Aug. 14, 2020

(87) PCT Pub. No.: WO2019/157711
PCT Pub. Date: Aug. 22, 2019

(65) Prior Publication Data
US 2021/0111818 A1 Apr. 15, 2021

(51) Int. Cl.
*H04B 17/318* (2015.01)
*H04L 1/00* (2006.01)
*H04L 5/00* (2006.01)

(52) U.S. Cl.
CPC ........ *H04B 17/318* (2015.01); *H04L 1/0009* (2013.01); *H04L 5/0048* (2013.01)

(58) Field of Classification Search
CPC ... H04B 17/318; H04L 1/0009; H04L 5/0048; H04W 24/10
See application file for complete search history.

(56) References Cited

U.S. PATENT DOCUMENTS

2013/0288730 A1* 10/2013 Gomadam ............. H04B 7/024
455/509
2014/0211656 A1* 7/2014 Hu ..................... H04W 36/0085
370/252

(Continued)

FOREIGN PATENT DOCUMENTS

CN 107078769 A 8/2017

OTHER PUBLICATIONS

U.S. Appl. No. 62/502,524, filed May 5, 2017 (Year: 2017).*

(Continued)

*Primary Examiner* — Ian N Moore
*Assistant Examiner* — Sun Jong Kim
(74) *Attorney, Agent, or Firm* — Kunzler Bean & Adamson

(57) ABSTRACT

Apparatuses, methods, and systems are disclosed for determining an encoding scheme for RSRP transmission. One method includes determining multiple reference signal received power ("RSRP") values. Each RSRP value of the multiple RSRP values corresponds to a beam measurement. The method includes determining a difference between a first RSRP value of the multiple RSRP values and a second RSRP value of the multiple RSRP values. The method also includes, in response to the difference being less than or equal to a predetermined threshold, transmitting information indicating the second RSRP value using a first encoding scheme. The method includes, in response to the difference being greater than the predetermined threshold, transmitting the information indicating the second RSRP value using a second encoding scheme. The first encoding scheme is different from the second encoding scheme.

20 Claims, 7 Drawing Sheets

(56) References Cited

U.S. PATENT DOCUMENTS

| | | | |
|---|---|---|---|
| 2018/0219664 A1* | 8/2018 | Guo | H04L 5/005 |
| 2019/0044599 A1* | 2/2019 | Kakishima | H04B 17/327 |
| 2020/0067590 A1* | 2/2020 | Wang | H04B 7/0632 |
| 2020/0344770 A1* | 10/2020 | Yuan | H04L 5/0023 |
| 2021/0281305 A1* | 9/2021 | Grant | H04W 72/042 |

OTHER PUBLICATIONS

"Discussion of beam management and reporting", 3GPP TSG RAN WG1 Meeting #90bis, Prague, P.R. Czech Oct. 9-13, 2017 (R1-1717866) (Year: 2017).*

Huawei, "Summary of remaining issues of beam measurement, reporting and indication", R1-1800100, Huawei, HiSilicon, 3GPP TSG RAN WGI Meeting Ad Hoc Meeting, Jan. 22-26, 2018, pp. 1-8.

Samsung, "Issues on beam management", R1-1800432, Samsung, 3GPP TSG RAN WG1 Meeting AH 1801, Jan. 22-26, 2018, pp. 1-12.

Lenovo, "Discussion of beam management and reporting", R1-1717866, Lenovo, Motorola Mobility, 3GPP TSG RAN WG1 Meeting #90bis, Oct. 9-13, 2017, pp. 1-4.

PCT/CN2018/076844, "International Search Report and the Written Opinion of the International Search Authority" ISA/CN, State Intellectual Property Office of the P.R. China, dated Sep. 21, 2018, pp. 1-8.

* cited by examiner

DETERMINING AN ENCODING SCHEME FOR DIFFERENTIAL RSRP REPORTING

FIELD

The subject matter disclosed herein relates generally to wireless communications and more particularly relates to determining an encoding scheme for RSRP transmission.

BACKGROUND

The following abbreviations are herewith defined, at least some of which are referred to within the following description: Third Generation Partnership Project ("3GPP"), Authentication Authorization and Accounting ("AAA"), Positive-Acknowledgment ("ACK"), Acknowledged Mode ("AM"), Access and Mobility Management Function ("AMF"), Access Server ("AS"), Authentication Server Function ("AUSE"), Cell Radio Network Temporary Identifier ("C-RNTI"), CSI-RS resource ID ("CRI"), Channel State Information ("CSI"), CSI RS ("CSI-RS"), Database ("DB"), Dedicated Control Channel ("DCCH"), Downlink ("DL"), Domain Name System ("DNS"), Enhanced Mobile Broadband ("eMBB"), Evolved Node B ("eNB"), Enhanced Subscriber Identification Module ("eSIM"), Equipment Identity Register ("EIR"), Evolved Packet Core ("EPC"), European Telecommunications Standards Institute ("ETSI"), E-UTRAN Radio Access Bearer ("E-RAB"), Evolved-Universal Terrestrial Radio Access Network ("E-UTRAN"), Frequency Division Duplex ("FDD"), Frequency Division Multiple Access ("FDMA."), Fully Qualified Domain Name ("FQDN"), Global System For Mobile Communications Association ("CSMA"), Hybrid Automatic Repeat Request ("HARQ"), Home Policy Control Function ("H-PCF"), Home Public Land Mobile Network ("HPLMN"), Identity or Identifier or Identification ("ID"), International Mobile Equipment Identity ("IMEI"), International Mobile Subscriber Identity ("IMSI"), Internet-of-Things ("IoT"), Long Term Evolution ("LTE"), Multiple Access ("MA"), Modulation Coding Scheme ("MCS"), Mobile Country Code ("MCC"), Mobile Network Code ("MNC"), Machine Type Communication ("MTC"), Master Information Block ("MIB"), Mobility Management ("MM"), Mobility Management Entity ("MME"), Non-Access Stratum ("NAS"), Narrowband ("NB"), Negative-Acknowledgment ("NACK") or ("NAK"), Next Generation Node B ("gNB"), New Radio Access Technology ("NR"), Network Data Analytics ("NWDA"), Orthogonal Frequency Division Multiplexing ("OFDM"), Over-the-Air ("OTA"), Policy Control Function ("PCF"), Packet Data Convergence Protocol ("PDCP"), Public Land Mobile Network ("PLMN"), Pointer ("PTR"), Quality of Service ("QoS"), Random Access Channel ("RACH"), Radio Link Control ("RLC"), Radio Link Failure ("RLF"), Radio Network Layer ("RNL"), Radio Resource Control ("RRC"), Radio Resource Management ("RRM"), Radio Access Network ("RAN"), Reference Signal ("RS"), Reference Signal Received Power ("RSRP"), Reference Signal Received Quality ("RSRQ"), Receive ("RX"), Service Data Unit ("SDU"), Sequence Number ("SN"), Single Carrier Frequency Division Multiple Access ("SC-FDMA"), Subscriber Management Function ("SMF"), Subscriber identity Module ("SIM"), System Information Block ("SIB"), Synchronization Signal Block ("SSB"), Subscription Concealed Identifier ("SUCI"), Subscription Permanent Identifier ("SUPI"), Timing Advance Group ("TAG"), Tracking Area ("TA"), Transport Block ("TB"), Transport Network Layer ("TNL"), Transmit ("TX"), Unified Data Management ("UDM"), User Data Repository ("UDR"), User Entity/Equipment (Mobile Terminal) ("UE"), Universal integrated Circuit Card ("UICC"), Uplink ("UL"), Universal to Mobile Telecommunications System ("UMTS"), User Plane Function ("UPF"), Universal Subscriber Identity Module ("USIM"), Visited Policy Control Function ("V-PCF"), Visited Public Land Mobile Network ("VPLMN"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, RSRP transmissions may be encoded. In such networks, certain RSRP values may not be transmitted.

BRIEF SUMMARY

Methods for determining an encoding scheme for RSRP transmission are disclosed. Apparatuses and systems also perform the functions of the apparatus. In one embodiment, the method includes determining multiple reference signal received power values. In such an embodiment, each reference signal received power value of the multiple reference signal received power values corresponds to a beam measurement. In various embodiments, the method includes determining a difference between a first reference signal received power value of the multiple reference signal received power values and a second reference signal received power value of the multiple reference signal received power values. In certain embodiments, the method includes, in response to the difference being less than or equal to a predetermined threshold, transmitting information indicating the second reference signal received power value using a first encoding scheme. In some embodiments, the method includes, in response to the difference being greater than the predetermined threshold, transmitting the information indicating the second reference signal received power value using a second encoding scheme. In certain embodiments, the first encoding scheme is different from the second encoding scheme.

In one embodiment, transmitting the information indicating the second reference signal received power value includes transmitting the information using one or more data structures, and each data structure of the one or more data structures includes a beam indicator and a differential value. In a further embodiment, the first encoding scheme includes transmitting the information using only one data structure of the one or more data structures. In certain embodiments, the second encoding scheme includes transmitting the information using two data structures of the one or more data structures. In various embodiments, the two data structures are combined to produce the information indicating the second reference signal received power value. In some embodiments, in response to the beam indicator of a first data structure of the two data structures including a predetermined value, the differential value of the first data structure is combined with the differential value of a second data structure to produce the information indicating the second reference signal received power value.

In certain embodiments, the predetermined value includes a null indicator. In some embodiments, the first reference signal received power value is a strongest reference signal received power value, and, for the second encoding scheme, the information indicating the second reference signal received power value indicates a difference between the strongest reference signal received power value and the second reference signal received power value. In various embodiments, for the second encoding scheme, the information indicating the second reference signal received power value indicates a difference between a fixed reference signal received power value and the second reference signal received power value. In certain embodiments, the second encoding scheme includes a higher resolution encoding than the first encoding scheme.

An apparatus for determining an encoding scheme for RSRP transmission, in one embodiment, includes a processor that: determines multiple reference signal received power values, wherein each reference signal received power value of the multiple reference signal received power values corresponds to a beam measurement; and determines a difference between a first reference signal received power value of the multiple reference signal received power values and a second reference signal received power value of the multiple reference signal received power values. In various embodiments, the apparatus includes a transmitter that: in response to the difference being less than or equal to a predetermined threshold, transmits information indicating the second reference signal received power value using a first encoding scheme; and in response to the difference being greater than the predetermined threshold, transmits the information indicating the second reference signal received power value using a second encoding scheme. In certain embodiments, the first encoding scheme is different from the second encoding scheme.

In one embodiment, a method for receiving an encoding scheme for RSRP transmissions includes receiving, using a first encoding scheme, information indicating a second reference signal received power value of multiple reference signal received power values in response to a difference between a first reference signal received power value of the multiple reference signal received power values and the second reference signal received power value being less than or equal to a predetermined threshold. In such an embodiment, each reference signal received power value of the multiple reference signal received power values corresponds to a beam measurement. In various embodiments, the method includes receiving, using a second encoding scheme, the information indicating the second reference signal received power value in response to the difference between the first reference signal received power value and the second reference signal received power value being greater than the predetermined threshold. In such embodiments, the first encoding scheme is different from the second encoding scheme.

In one embodiment, receiving the information indicating the second reference signal received power value includes receiving the information using one or more data structures, and each data structure of the one or more data structures includes a beam indicator and a differential value. In a further embodiment, the first encoding scheme includes receiving the information using only one data structure of the one or more data structures. In certain embodiments, the second encoding scheme includes receiving the information using two data structures of the one or more data structures. In various embodiments, the two data structures are combined to produce the information indicating the second reference signal received power value. In some embodiments, in response to the beam indicator of a first data structure of the two data structures including a predetermined value, the differential value of the first data structure is combined with the differential value of a second data structure to produce the information indicating the second reference signal received power value.

In certain embodiments, the predetermined value includes a null indicator. In some embodiments, the first reference signal received power value is a strongest reference signal received power value, and, for the second encoding scheme, the information indicating the second reference signal received power value indicates a difference between the strongest reference signal received power value and the second reference signal received power value. In various embodiments, for the second encoding scheme, the information indicating the second reference signal received power value indicates a difference between a fixed reference signal received power value and the second reference signal received power value, in certain embodiments, the second encoding scheme includes a higher resolution encoding than the first encoding scheme.

An apparatus for receiving an encoding scheme for RSRP transmissions, in one embodiment, includes a receiver that: receives, using a first encoding scheme, information indicating a second reference signal received power value of multiple reference signal received power values in response to a difference between a first reference signal received power value of the multiple reference signal received power values and the second reference signal received power value being less than or equal to a predetermined threshold, wherein each reference signal received power value of the multiple reference signal received power values corresponds to a beam measurement; and receives, using a second encoding scheme, the information indicating the second reference signal received power value in response to the difference between the first reference signal received power value and the second reference signal received power value being greater than the predetermined threshold, wherein the first encoding scheme is different from the second encoding scheme.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
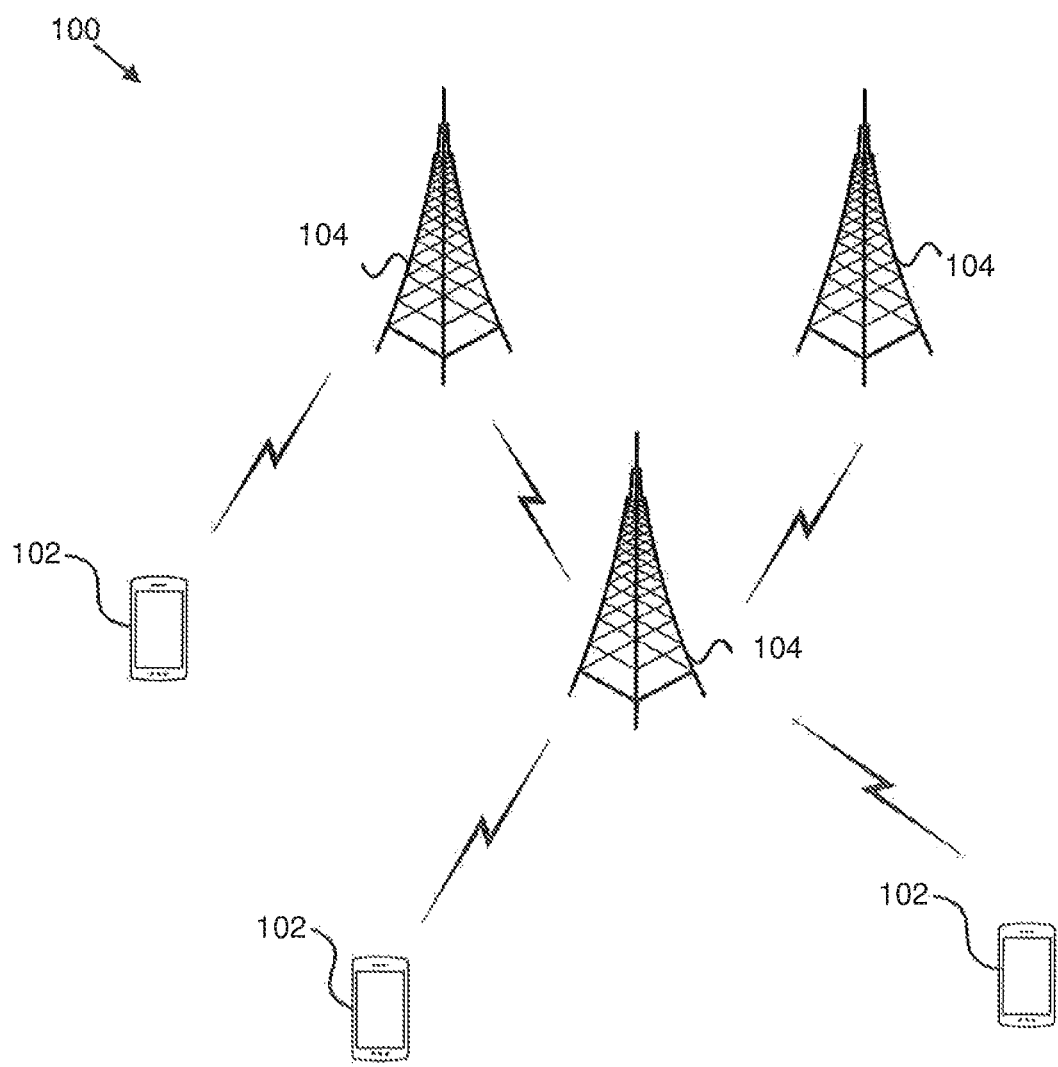
FIG. 1 is a schematic block diagram illustrating one embodiment of a wireless communication system for determining an encoding scheme for RSRP transmission and/or receiving an encoding scheme for RSRP transmissions.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may he distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the. code which execute. on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and; or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for determining an encoding scheme for RSRP transmission and/or receiving an encoding scheme for RSRP transmissions. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle onboard computers, network devices (e.g,, routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base unit, a base station, a Node-B, an eNB, a gNB, a Home Node-B, a relay node, a device, a network device, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art. In some embodiments, a network unit 104 may include one or more of the following network components an eNB, a gNB, an AMF, a RAN, a DB, an MME, a PCF, a UDR, a UPF, an NWDA, a serving gateway, and/or a UDM.

In one implementation, the wireless communication system 100 is compliant with the LTE of the 3GPP protocol, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In certain embodiments, a remote unit 102 may determine multiple reference signal received power values. In such an embodiment, each reference signal received power value of the multiple reference signal received power values corresponds to a beam measurement. In various embodiments, the remote unit 102 may determine a difference between a first reference signal received power value of the multiple reference signal received power values and a second reference signal received power value of the multiple reference signal received power values. In certain embodiments, the remote unit 102 may, in response to the difference being less than or equal to a predetermined threshold, transmit information indicating the second reference signal received power value using a first encoding scheme. In some embodiments, the remote unit 102 may, in response to the difference being greater than the predetermined threshold, transmit the information indicating the second reference signal received power value using a second encoding scheme. In certain embodiments, the first encoding scheme is different from the second encoding scheme. Accordingly, a remote unit 102 may be used for determining an encoding scheme for RSRP transmission.

In various embodiments, a network unit 104 may receive, using a first encoding scheme, information indicating a second reference signal received power value of multiple reference signal received power values in response to a difference between a first reference signal received power value of the multiple reference signal received power values and the second reference signal received power value being less than or equal to a predetermined threshold. In such an embodiment, each reference signal received power value of the multiple reference signal received power values corresponds to a beam measurement. In various embodiments, the network unit 104 may receive, using a second encoding scheme, the information indicating the second reference signal received power value in response to the difference between the first reference signal received power value and the second reference signal received power value being greater than the predetermined threshold. In such embodiments, the first encoding scheme is different from the second encoding scheme. Accordingly, a network unit 104 may be used for receiving an encoding scheme for RSRP transmissions.

Figure 2:
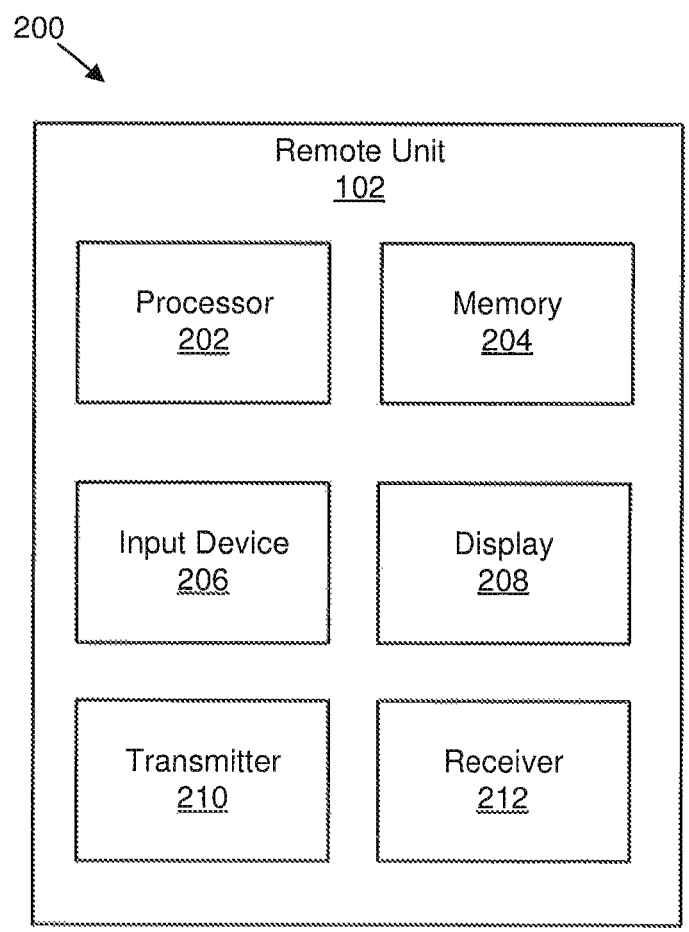
FIG. 2 is a schematic block diagram illustrating one embodiment of an apparatus that may be used for determining an encoding scheme for RSRP transmission.

FIG. 2 depicts one embodiment of an apparatus 200 that may be used for determining an encoding scheme for RSRP transmission. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may determine multiple reference signal received power values, wherein each reference signal received power value of the multiple reference signal received power values corresponds to a beam measurement; and determine a difference between a first reference signal received power value of the multiple reference signal received power values and a second reference signal received power value of the multiple reference signal received power values. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104. In various embodiments, the transmitter 210 may: in response to the difference being less than or equal to a predetermined threshold, transmit information indicating the second reference signal received power value using a first encoding scheme; and in response to the difference being greater than the predetermined threshold, transmit the information indicating the second reference signal received power value using a second encoding scheme. In certain embodiments, the first encoding scheme is different from the second encoding scheme. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
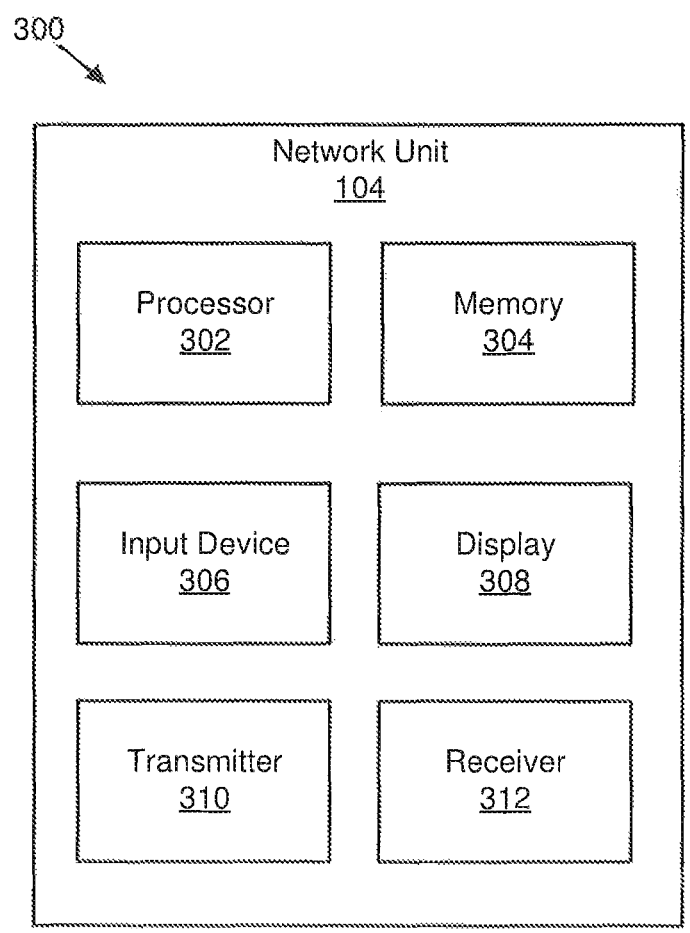
FIG. 3 is a schematic block diagram illustrating one embodiment of an apparatus that may be used for receiving an encoding scheme for RSRP transmissions.

FIG. 3 depicts one embodiment of an apparatus 300 that may be used for receiving an encoding scheme for RSRP transmissions. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the receiver 3.12 may receive, using a first encoding scheme, information indicating a second reference signal received power value of multiple reference signal received power values in response to a difference between a first reference signal received power value of the multiple reference signal received power values and the second reference signal received power value being less than or equal to a predetermined threshold, wherein each reference signal received power value of the multiple reference signal received power values corresponds to a beam measurement; and receive, using a second encoding scheme, the information indicating the second reference signal received power value in response to the difference between the first reference signal received power value and the second reference signal received power value being greater than the predetermined threshold, wherein the first encoding scheme is different from the second encoding scheme. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In some embodiments, such as for NR and/or for frequencies above threshold (e.g., 6 GHz). beam management may be used. In certain embodiments, a remote unit 102 may be configured with a set of SSB and/or CSI-RS resources for beam management. In various embodiments, a remote unit 102 may measure RSRP (e.g., L1-RSRP) of a set of SSB and/or CSI-RS resources and/or report a subset of the measurements that are above a threshold corresponding to the remote unit 102. In some embodiments, reported RSRP values are within a range between approximately −44 dBm and −140 dBm. In certain embodiments, RSRP values may be reported using a beam differential reporting. In some embodiments, a strongest beam (e.g., RS resource) may be reported in absolute value having a 1 dB step size and/or 7 bits of information. In various embodiments, a strongest beam may be reported in absolute value with respect to −44 dBm having a 1 dB step size and/or 7 bits of information. Moreover, in certain embodiments, beams other than a strongest beam may be reported as differential values with respect to the strongest beam and may have a 2 dB step size and/or 4 bits of information.

Figure 4:
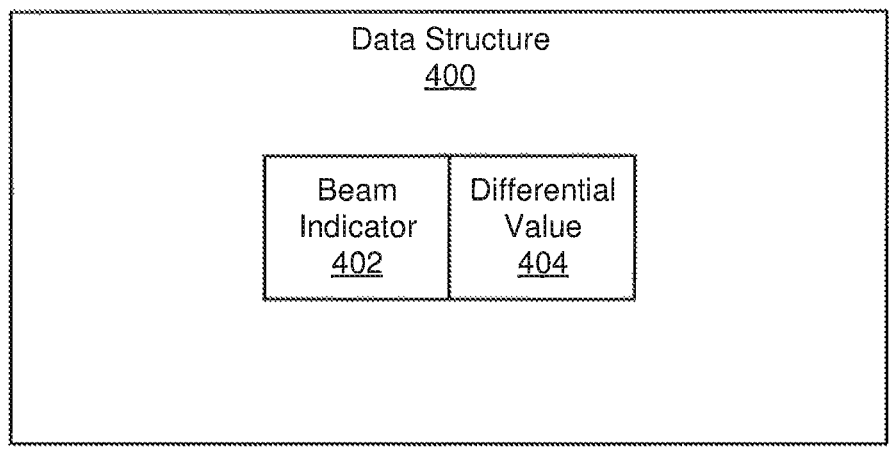
FIG. 4 illustrates one embodiment of a data structure.

FIG. 4 illustrates one embodiment of a data structure 400. The data structure 400 may be used to transmit a beam indicator 402 (e.g., CRI) corresponding to a beam and a differential value 404 (e.g., RSRP, ΔRSRP) corresponding to the beam. The beam indicator 402 may be determined based on a mapping between a beam and an index. In some embodiments, the mapping may be configured using signaling (e.g., RRC signaling). In various embodiments, the mapping may include a null indictor that is an index value not mapped to a beam.

Figure 5:
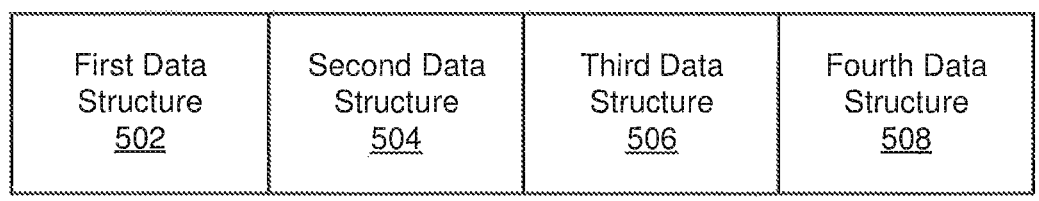
FIG. 5 illustrates one embodiment of encoding RSRP transmissions.

FIG. 5 illustrates one embodiment of encoding RSRP transmissions 500. In the illustrated embodiment, the RSRP transmissions 500 include a first data structure 502, a second data structure 504, a third data structure 506, and a fourth data structure 508. Each of the first data structure 502, the second data structure 504, the third data structure 506, and the fourth data structure 508 may be substantially similar to the data structure 400 and accordingly each include the beam indicator 402 and the differential value 404.

Figure 6:
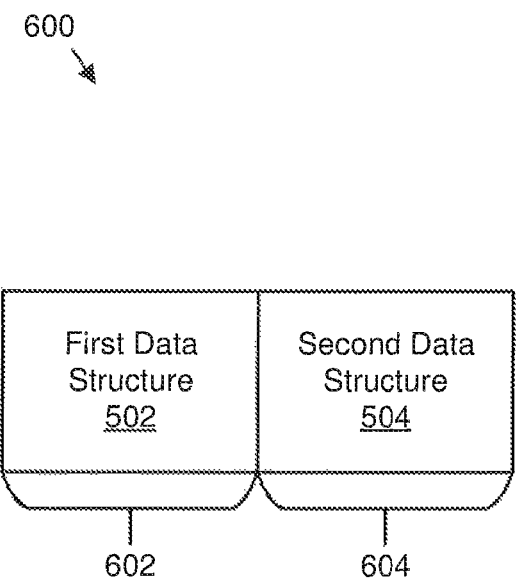
FIG. 6 illustrates another embodiment of encoding RSRP transmissions.

FIG. 6 illustrates another embodiment of encoding RSRP transmissions 600. In some embodiments, a remote unit 102 may report RSRP values of K beams ($RSRP_1$, $RSRP_2$, ..., $RSRP_K$) as follows: $[(CRI_1, RSRP_1), (CRI_2, \Delta RSRP_2) ..., (CRI_K, \Delta RSRP_K)]$, where $\Delta RSRP_i = RSRP_i - RSRP_1$ and $CRI_i$ is the CSI-RS resource ID of the corresponding CSI-RS. In certain embodiments, such as when the RSRP of SSB is reported, SSB index may be used in the place of CRI in the above reporting format. ($CRI_i$, $RSRP_i/\Delta RSRP_i$) or (SSB_$Index_i$, $RSRP_i/\Delta RSRP_i$) may be used to symbolically represent the data structure 400. In various embodiments, based on a RSRP beam report a network unit 104 receives, the network unit 104 may determine a set of DL beams used for transmission to a remote unit 102.

As may be appreciated, because differential RSRP may be defined as a difference between a strongest beam and each of the other beams, and only 4 bits are used with a step size of 2 dB, a range of RSRP values of the other beams has to be less than 32 dB of the strongest beam to be transmitted using the 4 bits. Accordingly, certain RSRP values may go unreported as shown in the following example. In this example, an assumption is made that there are three CSI-RS resources with their RSRP values as follows: $RSRP_1 = -50$ dBm, $RSRP_2 = -60$ dBm and $RSRP_3 = -90$ dBm. As such, the differential RSRPs are $\Delta RSRP_2 = 10$ dBm and $\Delta RSRP_3 = 40$ dBm. The absolute value of $RSRP_1$ (−50 dBm) may be reported using an initial encoding scheme 602 using the first data structure 502 in which the strongest beam is reported in absolute value with respect to −44 dBm having a 1 dB step size and 7 bits of information (e.g., as binary "0000110" because −50 dBm is 6 dB away from −44 dBm). The differential value of $RSRP_2$ ($\Delta RSRP_2 = 10$ dBm) may be reported using a first encoding scheme 604 using the second data structure 504 in which beams are reported as differential values with respect to the strongest beam and having a 2 dB step size and 4 bits of information (e.g., as binary "0101"). Moreover, the differential value of $\Delta RSRP_3$ may not be reported because 40 dB>32 dBm. Therefore, the network unit 104 may be unable to use the last beam, despite of its relatively good beam quality (e.g., any beam with RSRP greater than −140 dBm may be potentially useful for DL transmission).

To be able to transmit the differential value of $\Delta RSRP_3$, another encoding scheme may be used. In one embodiment, an encoding scheme may increase the number of bits used by the differential value 404 and/or increase a step size used for differential reporting. In other embodiments, an encoding scheme may sort beams in descending order and report pairwise differential RSRP. In certain embodiments, an encoding scheme may use variable length differential RSRP reporting.

Figure 7:
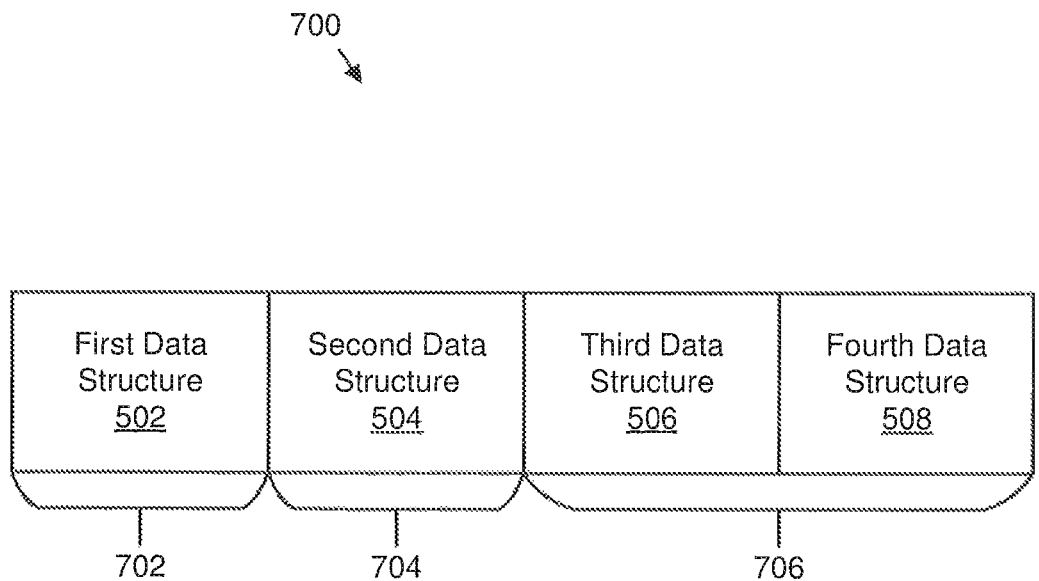
FIG. 7 illustrates a further embodiment of encoding RSRP transmissions.

FIG. 7 illustrates a further embodiment of encoding RSRP transmissions 700. In the embodiment of FIG. 7, the differential RSRP of a beam may be defined relative to a strongest beam in the same data structure as $\Delta RSRP_i=RSRP_i-RSRP_1$, wherein $RSRP_1$ is the RSRP of the strongest beam, a number of bits for the differential RSRP is 4, and a step size for the differential RSRP is 2 dB. For a CSI-RS beam i, in response to 32 dBm≤$\Delta RSRP_i$<511 dBm, two beam data structures 400 may be used instead of one: (($CRI_{null}$, $\Delta RSRP'_i$), ($CRI_i$, $\Delta RSRP''_i$)), where $\Delta RSRP'_i$ includes the 4 most significant bits and $\Delta RSRP''_i$ includes the 4 least significant bits of the $\Delta RSRP_i$ in binary form. In such an embodiment, $CRI_{null}$ (e.g., null CRI) may be either a pre-defined value (e.g., which is never assigned to any CSI-RS resources), or a CSI-RS index that is not assigned to any CRI-RS resources. In response to a network unit 104 receiving $CRI_{null}$ in an UL beam RSRP report, the network unit 104 combines two beam data structures 400 to derive the RSRP of one CSI-RS (or SSB) resource.

In one example, an assumption is made that there are three CSI-RS resources with their RSRP values as follows: $RSRP_1=-50$ dBm, $RSRP_2=-60$ dBm and $RSRP_3=-90$ dBm. As such, the differential RSRPs are $\Delta RSRP_2=10$ dBm and $\Delta RSRP_3=40$ dBm. As such, the differential RSRPs are $\Delta RSRP_2=-10$ dBm and $\Delta RSRP_3=40$ dBm. The absolute value of $RSRP_1$ (-50 dBm) may be reported using an initial encoding scheme 702 using the first data structure 502 in which the strongest beam is reported in absolute value with respect to -44 dBm having a 1 dB step size and 7 bits of information (e.g., as binary "0000110" because -50 dBm is 6 dB away from -44 dBm). The differential value of $RSRP_2$ ($\Delta RSRP_2$-10 dBm) may be reported using a first encoding scheme 704 using the second data structure 504 in which beams are reported as differential values with respect to the strongest beam and having a 2 dB step size and 4 bits of information (e.g., as binary "0101"). The first encoding scheme 704 is used because the $\Delta RSRP_2$ of 10 dBm is less than a threshold of 31 dBm (e.g., less than or equal to a threshold of 30 dBm). The differential value of $RSRP_3$ ($\Delta RSRP_3=40$ dBm) may be reported using a second encoding scheme 706 using the third data structure 506 and the fourth data structure 508 in which other beams are reported as differential values with respect to the strongest beam and having a 2 dB step size and 8 bits of information (e.g., as binary "00010100") in which the third data structure 506 carries the beam indicator 402 having a null indicator and the differential value 404 for $\Delta RSRP'_3$ (e.g., binary "0001"), and the fourth data structure 508 carries the differential value 404 for $\Delta RSRP''_3$ (e.g., binary "0100"). In such an example, a formula rendering of the beam report may be as follows: [[($CRI_1$, 0b0000110), ($CRI_2$, 0b0101), ($CRI_{null}$, 0b0001), ($CRI_3$, 0b0100)]. In such an embodiment, a network unit 104 may interpret the last two data structures "($CRI_{null}$, 0b0010), ($CRI_3$, 0b1000)" jointly as $\Delta RSRP_3=40$ dBm (and therefore $RSRP_3=-90$ dBm). The second encoding scheme 706 is used because the $\Delta RSRP_3$ of 40 dBm is greater than or equal to a threshold of 31 dBm (e.g., greater than a threshold of 30 dBm). As may be appreciated, in response to SSB being reported instead of CSI-RS, an SSB index may take the place of CRI. Moreover, an $SSB_{null}$ may be defined similar to a $CRI_{null}$.

In some embodiments, because the second encoding scheme 706 uses 8 bits to represent the RSRP of a beam, a differential RSRP with respect to a strongest beam may be either represented with a 1 dB step size, or an absolute RSRP with respect to -44 dBm may be represented with a 1 dB step size. In such embodiments, the selection of the differential RSRP or the absolute RSRP and/or the 1 dB step size may be specified in a specification, or configured using signaling (e.g., RRC signaling).

As may be appreciated, by using the second encoding scheme 706, a range of differential RSRP reporting may be expanded to enable all valid RSRP in a range of -44 dBm to -140 dBm to be reported. As such, a beam management process may be more efficient because no beam go unreported due to having a lower RSRP than a strongest beam by more than 32 dBm.

Figure 8:
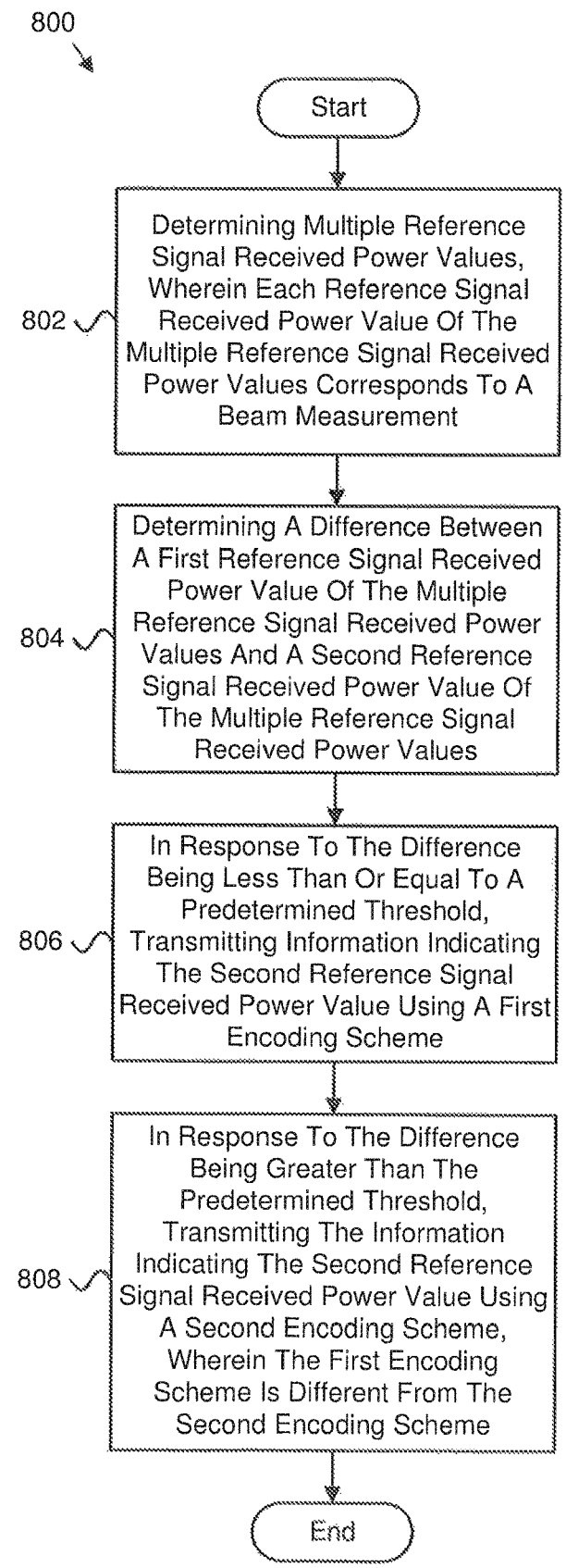
FIG. 8 is a schematic flow chart diagram illustrating one embodiment of a method for determining an encoding scheme for RSRP transmission.

FIG. 8 is a schematic flow chart diagram illustrating one embodiment of a method 800 for determining an encoding scheme for RSRP transmission. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

The method 800 may include determining 802 multiple reference signal received power values. In such embodiments, each reference signal received power value of the multiple reference signal received power values corresponds to a beam measurement. In various embodiments, the method 800 includes determining 804 a difference between a first reference signal received power value of the multiple reference signal received power values and a second reference signal received power value of the multiple reference signal received power values. In certain embodiments, the method 800 includes, in response to the difference being less than or equal to a predetermined threshold, transmitting 806 information indicating the second reference signal received power value using a first encoding scheme. In some embodiments, the method 800 includes, in response to the difference being greater than the predetermined threshold, transmitting 808 the information indicating the second reference signal received power value using a second encoding scheme. In certain embodiments, the first encoding scheme is different from the second encoding scheme.

In one embodiment, transmitting the information indicating the second reference signal received power value includes transmitting the information using one or more data structures, and each data structure of the one or more data structures includes a beam indicator and a differential value. In a further embodiment, the first encoding scheme includes transmitting the information using only one data structure of the one or more data structures. In certain embodiments, the second encoding scheme includes transmitting the information using two data structures of the one or more data structures. In various embodiments, the two data structures are to combined to produce the information indicating the second reference signal received power value. In some embodiments, in response to the beam indicator of a first data structure of the two data structures including a predetermined value, the differential value of the first data structure is combined with the differential value of a second data structure to produce the information indicating the second reference signal received power value.

In certain embodiments, the predetermined value includes a null indicator. In some embodiments, the first reference signal received power value is a strongest reference signal received power value, and, for the second encoding scheme, the information indicating the second reference signal received power value indicates a difference between the strongest reference signal received power value and the second reference signal received power value. In various embodiments, for the second encoding scheme, the information indicating the second reference signal received power value indicates a difference between a fixed reference signal received power value and the second reference signal.

received power value. In certain embodiments, the second encoding scheme includes a higher resolution encoding than the first encoding scheme.

Figure 9:
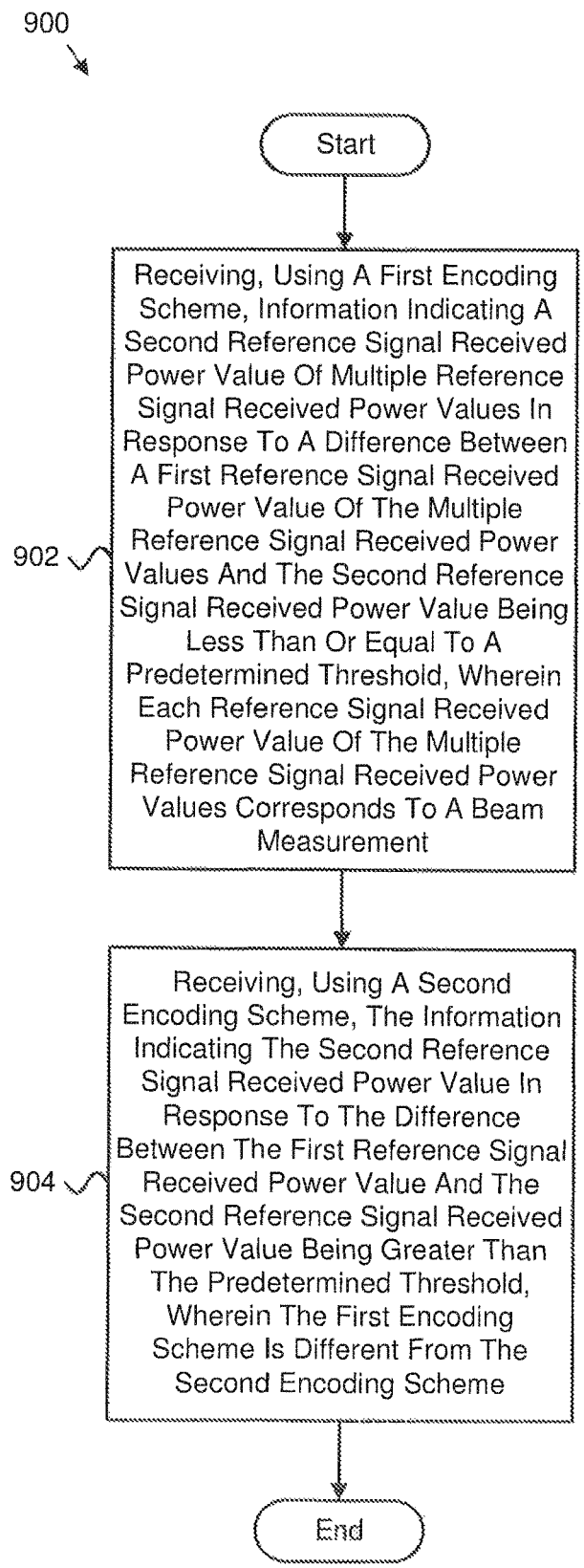
FIG. 9 is schematic flow chart diagram illustrating one embodiment of a method for receiving an encoding scheme for RSRP transmissions.

FIG. 9 is a schematic flow chart diagram illustrating one embodiment of a method 900 for receiving an encoding scheme for RSRP transmissions. In some embodiments, the method 900 is performed by an apparatus, such as the network unit 104. In certain embodiments, the method 900 may be performed by a processor executing program code, for example, a microcontroller, a microprocessor, a CPU, a GPU, an auxiliary processing unit, a FPGA, or the like.

The method 900 may include receiving 902, using a first encoding scheme, information indicating a second reference signal received power value of multiple reference signal received power values in response to a difference between a first reference signal received power value of the multiple reference signal received power values and the second reference signal received power value being less than or equal to a predetermined threshold. In such embodiments, each reference signal received power value of the multiple reference signal received power values corresponds to a beam measurement. In various embodiments, the method 900 includes receiving 904, using a second encoding scheme, the information indicating the second reference signal received power value in response to the difference between the first reference signal received power value and the second reference signal received power value being greater than the predetermined threshold. In such embodiments, the first encoding scheme is different from the second encoding scheme.

In one embodiment, receiving the information indicating the second reference signal received power value includes receiving the information using one or more data structures, and each data structure of the one or more data structures includes a beam indicator and a differential value. In a further embodiment, the first encoding scheme includes receiving the information using only one data structure of the one or more data structures. In certain embodiments, the second encoding scheme includes receiving the information using two data structures of the one or more data structures. In various embodiments, the two data structures are combined to produce the information indicating the second reference signal received power value. In some embodiments, in response to the beam indicator of a first data structure of the two data structures including a predetermined value, the differential value of the first data structure is combined with the differential value of a second data structure to produce the information indicating the second reference signal received power value.

In certain embodiments, the predetermined value includes a null indicator. In some embodiments, the first reference signal received power value is a strongest reference signal received power value, and, for the second encoding scheme, the information indicating the second reference signal received power value indicates a difference between the strongest reference signal received power value and the second reference signal received power value. In various embodiments, for the second encoding scheme, the information indicating the second reference signal received power value indicates a difference between a fixed reference signal received power value and the second reference signal received power value. In certain embodiments, the second encoding scheme includes a higher resolution encoding than the first encoding scheme.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a user equipment, the method comprising:
determining a plurality of reference signal received power values for a plurality of channel state information reference signals (CSI-RSs), wherein each reference signal received power value of the plurality of reference signal received power values corresponds to a beam measurement;
determining a difference between a first reference signal received power value of the plurality of reference signal received power values for a first CSI-RS of the plurality of CSI-RSs and a second reference signal received power value of the plurality of reference signal received power values for a second CSI-RS of the plurality of CSI-RSs;
in response to the difference being less than or equal to a predetermined threshold, transmitting information indicating the second reference signal received power value using a first encoding scheme together with a second CSI-RS resource indicator (CRI) corresponding to the second CSI-RS, wherein the first encoding scheme comprises the second CRI together with a representation of the difference; and
in response to the difference being greater than the predetermined threshold, transmitting the information indicating the second reference signal received power value using a second encoding scheme with the second CRI, wherein the second encoding scheme comprises a null CRI together with a first portion of the representation of the difference and the second CRI together with a second portion of the representation of the difference wherein the null CRI is a CRI not mapping to any of the plurality of CSI-RSs.

2. The method of claim 1, wherein:
transmitting the information indicating the second reference signal received power value comprises transmitting the information using one or more data structures; and
each data structure of the one or more data structures comprises a beam indicator and a differential value.

3. The method of claim 2, wherein the first encoding scheme comprises transmitting the information using only one data structure of the one or more data structures.

4. The method of claim 2, wherein the second encoding scheme comprises transmitting the information using two data structures of the one or more data structures.

5. The method of claim 4, wherein the two data structures are combined to produce the information indicating the second reference signal received power value.

6. The method of claim 4, wherein, in response to the beam indicator of a first data structure of the two data structures comprising a predetermined value, the differential value of the first data structure is combined with the differential value of a second data structure to produce the information indicating the second reference signal received power value.

7. The method of claim 6, wherein the predetermined value comprises a null indicator.

8. The method of claim 1, wherein:
the first reference signal received power value is a strongest reference signal received power value; and
for the second encoding scheme, the information indicating the second reference signal received power value indicates a difference between the strongest reference signal received power value and the second reference signal received power value.

9. The method of claim 1, wherein, for the second encoding scheme, the information indicating the second reference signal received power value indicates a difference between a fixed reference signal received power value and the second reference signal received power value.

10. The method of claim 1, wherein the second encoding scheme comprises a higher resolution encoding than the first encoding scheme.

11. An apparatus comprising a user equipment, the apparatus further comprising:
a processor that:
determines a plurality of reference signal received power values, wherein each reference signal received power value of the plurality of reference signal received power values corresponds to a beam measurement; and
determines a difference between a first reference signal received power value of the plurality of reference signal received power values and a second reference signal received power value of the plurality of reference signal received power values; and
a transmitter that:
in response to the difference being less than or equal to a predetermined threshold, transmits information indicating the second reference signal received power value using a first encoding scheme together with a second index corresponding to the second reference signal received power, wherein the first encoding scheme comprises the second index together with a representation of the difference; and
in response to the difference being greater than the predetermined threshold, transmits the information indicating the second reference signal received power value using a second encoding scheme, wherein the second encoding scheme comprises a null index together with a first portion of the representation of the difference and the second index together with a second portion of the representation of the difference wherein the null index is an index not mapping to any of the plurality of CSI-RSs.

12. A method of a network device, the method comprising:
receiving, using a first encoding scheme, information indicating a second reference signal received power value of a plurality of reference signal received powers together with a second index corresponding to the second reference signal received power in response to a difference between a first reference signal received power value of the plurality of reference signal received power values and the second reference signal received power value being less than or equal to a predetermined threshold, wherein each reference signal received power value of the plurality of reference signal received power values corresponds to a beam measurement, and the first encoding scheme comprises the second index together with a representation of the difference; and
receiving, using a second encoding scheme, the information indicating the second reference signal received power value in response to the difference between the first reference signal received power value and the second reference signal received power value being greater than the predetermined threshold, wherein the second encoding scheme comprises a null index together with a first portion of the representation of the difference and the second index together with a second portion of the representation of the difference wherein the null index is an index not mapping to any of the plurality of CSI-RSs.

13. The method of claim 12, wherein:
receiving the information indicating the second reference signal received power value comprises receiving the information using one or more data structures; and
each data structure of the one or more data structures comprises a beam indicator and a differential value.

14. The method of claim 13, wherein the first encoding scheme comprises receiving the information using only one data structure of the one or more data structures.

15. The method of claim 13, wherein the second encoding scheme comprises receiving the information using two data structures of the one or more data structures.

16. The method of claim 15, wherein the two data structures are combined to produce the information indicating the second reference signal received power value.

17. The method of claim 15, wherein, in response to the beam indicator of a first data structure of the two data structures comprising a predetermined value, the differential value of the first data structure is combined with the differential value of a second data structure to produce the information indicating the second reference signal received power value.

18. The method of claim 17, wherein the predetermined value comprises a null indicator.

19. The method of claim 12, wherein:
the first reference signal received power value is a strongest reference signal received power value; and
for the second encoding scheme, the information indicating the second reference signal received power value indicates a difference between the strongest reference signal received power value and the second reference signal received power value.

20. The method of claim 12, wherein, for the second encoding scheme, the information indicating the second reference signal received power value indicates a difference between a fixed reference signal received power value and the second reference signal received power value.

* * * * *